(12) United States Patent
Gorobets

(10) Patent No.: US 7,634,624 B2
(45) Date of Patent: Dec. 15, 2009

(54) MEMORY SYSTEM FOR DATA STORAGE AND RETRIEVAL

(75) Inventor: Sergey Anatolievich Gorobets, Edinburgh (GB)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/256,891

(22) Filed: Sep. 27, 2002

(65) Prior Publication Data

US 2003/0070036 A1 Apr. 10, 2003

(30) Foreign Application Priority Data

Sep. 28, 2001 (GB) ................ 0123410.3

(51) Int. Cl.
*G06F 13/00* (2006.01)
(52) U.S. Cl. ..................... 711/159; 711/154
(58) Field of Classification Search .......... 711/154, 711/159

See application file for complete search history.

(56) References Cited

U.S. PATENT DOCUMENTS

| | | | |
|---|---|---|---|
| 4,845,662 A * | 7/1989 | Tokumitsu | ............... 711/219 |
| 5,596,526 A | 1/1997 | Assar et al. | |
| 5,606,660 A | 2/1997 | Estakhri et al. | |
| 5,818,350 A | 10/1998 | Estakhri et al. | |
| 5,838,614 A | 11/1998 | Estakhri et al. | |
| 5,924,113 A | 7/1999 | Estakhri et al. | |
| 5,991,847 A * | 11/1999 | Ballard et al. | ............... 711/3 |
| 6,000,006 A * | 12/1999 | Bruce et al. | ............... 711/103 |
| 6,018,265 A | 1/2000 | Keshtbod | |
| 6,041,001 A | 3/2000 | Estakhri | |
| 6,069,827 A | 5/2000 | Sinclair | |
| 6,076,137 A | 6/2000 | Asnaashari | |
| 6,084,483 A | 7/2000 | Keshtbod | |
| 6,172,906 B1 | 1/2001 | Estakhri et al. | |
| 6,275,436 B1 | 8/2001 | Tobita et al. | |
| 6,285,607 B1 | 9/2001 | Sinclair | |
| 6,327,639 B1 | 12/2001 | Asnaashari | |
| 6,345,367 B1 | 2/2002 | Sinclair | |
| 6,385,667 B1 | 5/2002 | Estakhri et al. | |
| 6,467,021 B1 | 10/2002 | Sinclair | |
| 6,490,649 B2 | 12/2002 | Sinclair | |
| 6,567,307 B1 | 5/2003 | Estakhri | |
| 6,571,318 B1 * | 5/2003 | Sander et al. | ............... 711/137 |
| 6,578,127 B1 | 6/2003 | Sinclair | |

(Continued)

FOREIGN PATENT DOCUMENTS

EP 0 897 579 B1 7/2000

(Continued)

*Primary Examiner*—Hetul Patel
(74) *Attorney, Agent, or Firm*—Leffert Jay & Polglaze, P.A.

(57) ABSTRACT

According to a first aspect of an embodiment of the invention, there is provided a method of data storage and retrieval for use in a solid state memory system, having a non-volatile memory, wherein data is written to the non-volatile memory in the form of at least one logical sector the method comprising: monitoring the logical sector data which is to be written to the non-volatile memory, detecting the presence of a pattern in the logical sector data, upon detecting a repetitive pattern recording the repetitive pattern of the logical sector in a sector address table in the non-volatile memory without making a record of the logical sector data in the non- volatile memory.

13 Claims, 5 Drawing Sheets

U.S. PATENT DOCUMENTS

| | | |
|---|---|---|
| 6,587,382 B1 | 7/2003 | Estakhri et al. |
| 6,711,059 B2 | 3/2004 | Sinclair et al. |
| 6,721,819 B2 | 4/2004 | Estakhri et al. |
| 6,721,843 B1 | 4/2004 | Estakhri |
| 6,725,321 B1 | 4/2004 | Sinclair et al. |
| 6,725,342 B1 * | 4/2004 | Coulson ............... 711/141 |
| 6,728,851 B1 | 4/2004 | Estakhri et al. |
| 6,751,155 B2 | 6/2004 | Gorobets |
| 6,757,800 B1 | 6/2004 | Estakhri et al. |
| 6,772,274 B1 | 8/2004 | Estakhri |
| 6,813,678 B1 | 11/2004 | Sinclair et al. |
| 6,898,662 B2 | 5/2005 | Gorobets |
| 6,912,618 B2 | 6/2005 | Estakhri et al. |
| 6,950,918 B1 | 9/2005 | Estakhri |
| 6,957,295 B1 | 10/2005 | Estakhri |
| 6,973,519 B1 | 12/2005 | Estakhri et al. |
| 6,978,342 B1 | 12/2005 | Estakhri et al. |
| 7,000,064 B2 | 2/2006 | Payne et al. |

FOREIGN PATENT DOCUMENTS

| | | |
|---|---|---|
| EP | 0 891 580 B1 | 11/2000 |
| EP | 0 896 699 B1 | 11/2000 |
| EP | 0 852 766 B1 | 5/2001 |
| EP | 0 852 765 B1 | 9/2001 |
| EP | 0 722 585 B1 | 5/2002 |
| EP | 0 910 826 B1 | 6/2002 |
| EP | 0 691 008 B1 | 11/2002 |
| EP | 0 861 468 B1 | 4/2003 |
| EP | 0 978 040 B1 | 5/2004 |
| EP | 1 157 328 B1 | 5/2005 |
| GB | 2 291 991 A | 7/1996 |
| GB | 2 297 637 A | 7/1996 |
| GB | 2 348 991 B | 12/2002 |
| GB | 2 351 822 B | 1/2003 |
| GB | 2 384 337 A | 7/2003 |
| GB | 2 384 883 A | 10/2005 |
| GB | 2 384 338 B | 11/2005 |
| GB | 2 384 072 B | 12/2005 |
| GB | 2 411 499 B | 2/2006 |
| IS | 117881 | 5/2003 |

* cited by examiner

MEMORY SYSTEM FOR DATA STORAGE AND RETRIEVAL

CROSS REFERENCE TO RELATED APPLICATION

This application claims the benefit of the priority date of my earlier filed British Application No. 0123410.3, entitled "Memory System For Data Storage and Retreival", filed on Sep. 28, 2001.

BACKGROUND OF THE INVENTION

1. Field of the Invention

The present invention relates generally to a solid state memory system for a data storage and retrieval having a memory controller for controlling access to a non-volatile memory of the solid state memory system and particularly to a method and apparatus for accessing data stored within the non-volatile memory of the solid state memory system at an increased speed when the data has a repetitive pattern.

2. Description of the Prior Art

It is known to use solid state memory systems to try to emulate magnetic disk storage devices in computer systems. In particular, it is an aim of the industry to try to increase the speed of operation of solid state memory systems to better emulate magnetic disc storage.

A typical memory system comprises a non-volatile memory, such as a Flash memory, and a controller. The flash memory has individually addressable sectors wherein a memory sector is a group of flash memory locations which is allocated for storage of one Logical Sector. a memory sector need not be a physical partition within Flash memory, nor need it be contiguous Flash memory locations, so the memory sector address may be a virtual address conveniently used by the controller. The controller writes data structures to and reads data structures from the memory, and translates logical addresses received from the host to physical, or virtual addresses, of the memory sectors in the memory.

When a logical sector write command is received from the host, the controller translates a logical address received from the host and allocates a memory sector for the logical sector to be written to. The controller is also responsible for maintaining a table of logical addresses with respective physical addresses which have been allocated by the controller. The table is referred to as the Sector Allocation Table or SAT. there is also, in some cases, a system or hierarchy of SATs to provide improved ease of access and to reduce the update frequency required.

The physical or virtual, sector addresses in the SAT are typically ordered by logical sector address, where the Nth SAT entry includes the physical address of a sector to which data having logical address N has been written. When a sector read command is received from the host, the controller looks up a logical sector address received from the host in the SAT in order to obtain the physical sector address which the controller previously allocated to the logical sector. On some occasions one SAT entry is used to define the address of a group of contiguous memory sectors containing a group of contiguous logical sectors.

A feature of the flash memory is that the flash memory must be pre-erased before the data can be written. This means that, in general, in the flash memory system, when a logical sector is written, the obsolete copy of the logical sector should be erased before or after. Here, the term erased memory sector will be used for a memory sector which has all the cells erased. Quite often the memory sectors are not individually erasable, but, grouped to be erasable in units or blocks. The controller can use various methods to maintain the flash memory. Any memory sector which has been written to will be treated by the controller as a memory sector which has not been erased.

The host can issue a sector erase command to erase the logical sector in the memory in order to delete all the sector data and pre-erase the card for a faster sector write operation in the future. This results in the sector write operation consisting of Flash memory writes only and no erases. The term erased logical sector is generally used not only for a logical sector which has been erased, but, also for a sector which has not yet been written. Due to the complexity of flash memory organization and complexity of its maintenance, various algorithms can be used which allows an erased logical sector to be temporarily marked in the SAT as obsolete, but, the memory sector containing the logical sector can be erased later. The example of such a memory system is illustrated in the "Memory System" detailed in patent application WO 00/49488 PCT/GB00,00550). FIG. 1 (prior art) illustrates the address translation algorithm of the Memory System of WO 00/49488. FIG. 2 illustrates the sector read operation of the Memory System of WO 00/49488. WO 00/49488 describes the technique of using the SAT Table not only to define physical locations of the written logical sectors, but, also to mark them as deleted or bad. In the case of the deleted or never written sector the corresponding SAT entry includes the virtual address value showing that the sector includes no data the controller sets all the bytes of the sector data buffer to all 1s and the sector then will be output to the host.

Thus, a need arises to obviate or mitigate at least one of the aforementioned problems.

SUMMARY OF THE INVENTION

According to a first aspect of the invention there is provided a method of data storage and retrieval for use in a solid state memory system, having a non-volatile memory, wherein data is written to the non-volatile memory in the form of at least one logical sector the method comprising:

monitoring the logical sector data which is to be written to the non-volatile memory, detecting the presence of a pattern in the logical sector data, upon detecting a repetitive pattern recording the repetitive pattern of the logical sector in a sector address table in the non-volatile memory without making a record of the logical sector data in the non-volatile memory.

Preferably the corresponding logical sector is marked as being erased after the repetitive pattern of the logical sector has been recorded in the sector address table.

According to a second aspect of the invention there is provided a non-volatile memory to which data is written in at least one logical sector, the system comprising:

means for monitoring logical sector data which is to be written to the non-volatile memory, means for detecting the presence of a pattern in the logical sector data, recording means for recording the pattern of the logical sector data, and means for writing to the recording means, wherein upon detection of a repetitive pattern a recording of the repetitive data pattern of the logical sector data is made to the recording means without writing the logical sector data to the corresponding physical sector location in the non-volatile memory.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 3:
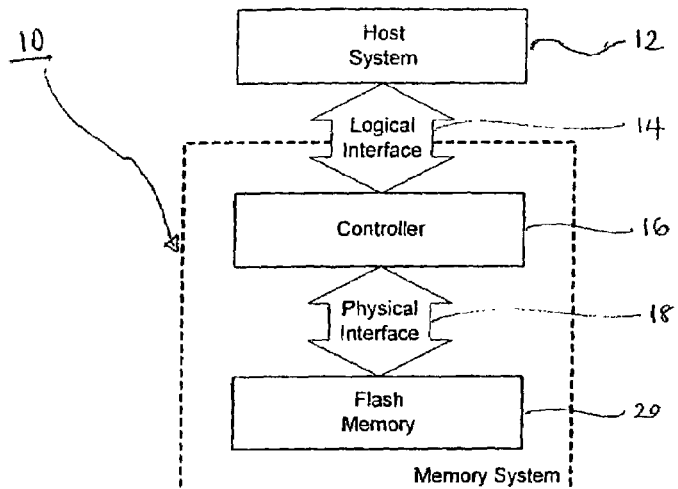
FIG. 3 shows a flash memory system in accordance with an embodiment of the present invention.

With reference to FIG. 3, there is shown a flash memory system 10 in which a method of achieving faster access of the data in the memory system is adopted. The memory system 10 comprises a controller 16 and flash memory 20 which are connected by physical interface 18. The memory system 10 is connected to an associated host system 12 by logical interface 14. The logical interface 14 connects to the controller 16 of the memory system 10 and reads from, and writes data to the host system 12 in logical sectors of 512 bytes of data. Each logical sector is identified by a logical address which in this case is a sequential logical block address (LBA) and may be accessed randomly for either reading or writing data. Data is written to and read from the flash memory 20 in physical sectors each of which typically has sufficient capacity for 512 bytes of data from the host system, plus 16 bytes of overhead data appended by the controller 16. Each physical sector is identified by a physical sector address which normally has separate components identifying the flash chip within the memory subsystem, the flash block within the flash chip and the physical sector within the flash block. Data may only be written to a physical sector if the sector has previously been erased, and erasure takes place in response to a command at the physical interface 18 in units of a flash block which typically includes 32 physical sectors. Physical sectors may be randomly accessed for reading data. In the present arrangement, wherein the memory comprises NAND Flash chips, a physical sector is equivalent to a physical page within the flash array and has a capacity of 528 bytes. In this case, each flash chip is considered to comprise four arrays, each of which can be programmed with one sector at any time.

The controller 16 provides a method of detecting the pattern of the logical sector data which is due to be written to the flash memory 20 when a sector write command is issued by the host 12. If the sector data has a flat repetitive pattern, for example, if all the bytes of the sector data are the same, then the controller 16 may use the corresponding sector address table SAT entry to record the pattern, which in this case is a content of any one byte of sector data, and mark the logical sector as being erased. It is therefore, not necessary to write the sector data to the flash memory 20 in order to record the sector data, instead it is enough to keep the information about the sector pattern in the SAT. The obsolete copy of the sector data must then be erased in flash memory, as is the case when any new sector data is written to the flash memory system. However, in this case, the new valid sector data is stored in a SAT entry instead of in a memory sector in flash memory.

When it is desired that the sector data be read, a logical sector read command is sent by the host 12 and the controller 16 looks up the SAT and checks the virtual address value provided by the SAT shows that the sector data is deleted, the controller 16 takes the sector data pattern value from the entry within the SAT to output the sector data as if it was being retrieved from the flash memory 20.

This operation results in the speed of the access to the flash data by the host 12 being greatly improved as the sector write operation no longer comprises the step of sector data write to the flash memory 20 and the sector read operation does not comprise the step of sector data read from the flash memory 20.

Some hosts may write a large number of flat data sectors which can be a part of large uncompressed data base files. It is also the case that the host 12 can deliberately 'precondition' or format the memory system by writing all 0's or 1's in order to delete all the information (which is a standard security feature). The ATA standard Format Track command can also be treated as the flat sector write command.

Figure 4A:
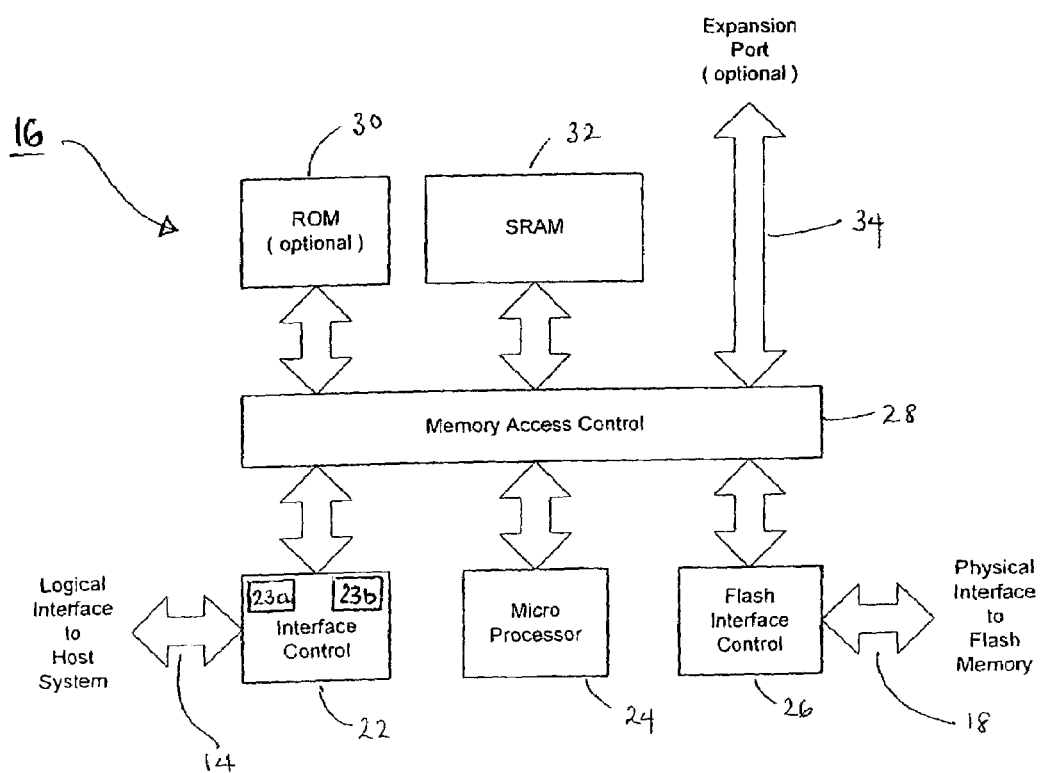
FIG. 4a shows a first embodiment of the hardware architecture of the controller of the flash memory of FIG. 3.
Figure 4B:
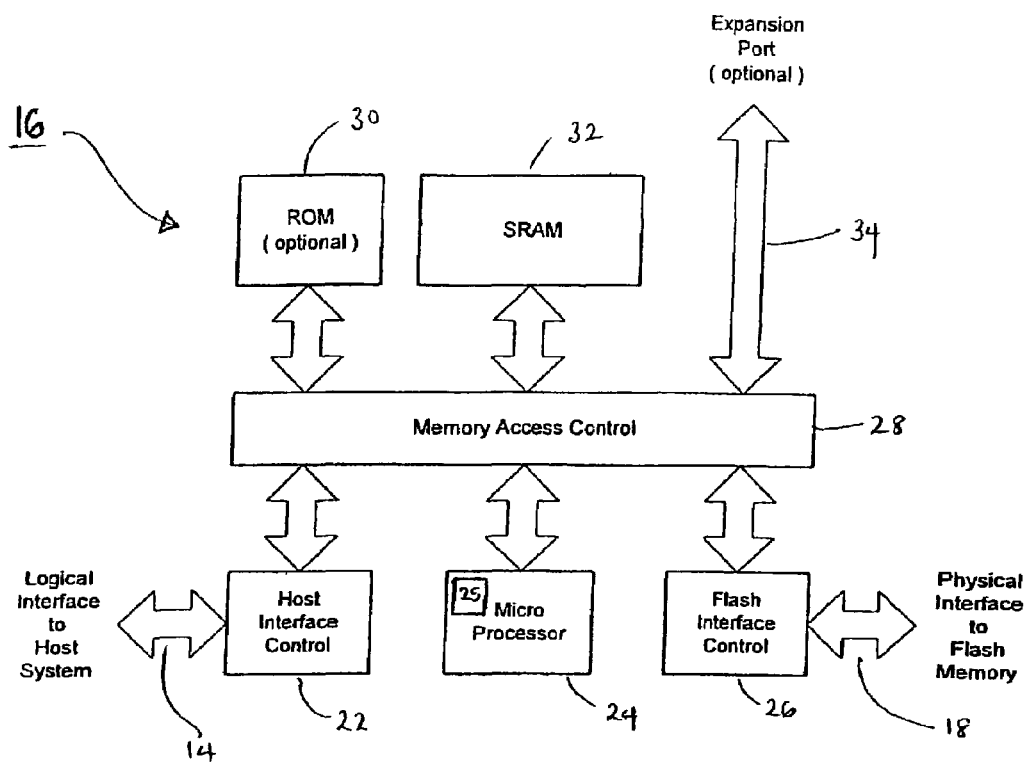
FIG. 4b shows a second embodiment of the hardware architecture of the controller of the flash memory of FIG. 3.

With reference to FIGS. 4a and 4b there is shown the hardware architecture of the controller 16 of flash memory system 10. The controller comprises memory access control, or system bus 28, host interface control block 22 to which logical interface 14 connects, microprocessor 24, flash interface control block 26 to which physical interface 18 connects, Read Only Memory (ROM) 30, and synchronous random access memory (SRAM) 32.

The host interface control block 22 provides the path to the controller 16 for data flow to and from host system 12.

With reference to FIG. 4a there is shown a first embodiment of the hardware architecture of controller 16 in which the host interface control block 22 has, embedded within itself, a pattern detection circuit 23a which compares all the data portions of incoming data when the host 12 issues a sector write command and sends sector data to the memory system 10. The pattern detection circuit 23a then indicates to the microprocessor whether the incoming data has a flat pattern. The pattern detection circuit 23a compares all the sector data portions (1, 2 or 4 bytes) with each other. This can be done, for example, by fetching the first data portion and XOR-ing it with all other data portions, at least one non-zero result triggers signaling of a non-flat pattern. Flat pattern can also be detected by XOR-ing every incoming data portion with the previous one. The pattern value of the incoming data then can be obtained by the microprocessor 24 from the pattern detection circuit 23a or by reading any data portion from the sector buffer SRAM 32.

The host interface 22 has pattern output circuit 23b which can be programmed by the microprocessor 24 to output a certain pattern to the host 22 when the sector read command is received from the host, instead of transferring the sector data from the sector buffer SRAM 32. The pattern value is obtained by the microprocessor 24 from the corresponding SAT entry when the sector is marked there as erased.

With reference to FIG. 4b there is shown a second embodiment of the hardware architecture of controller 16 in which firmware 25 of the microprocessor 24 provides a pattern detection facility which can compare all the data portions of the sector data by reading the sector buffer in SRAM 32. Firmware 25 is instruction code for the microprocessor and is normally stored in one of the memories (ROM, SRAM or Flash memory).

In this arrangement the pattern output can also be provided by the firmware of microprocessor 24 which can simply fill up all the data portions in the sector buffer in SRAM 32 by the pattern values.

Figure 5:
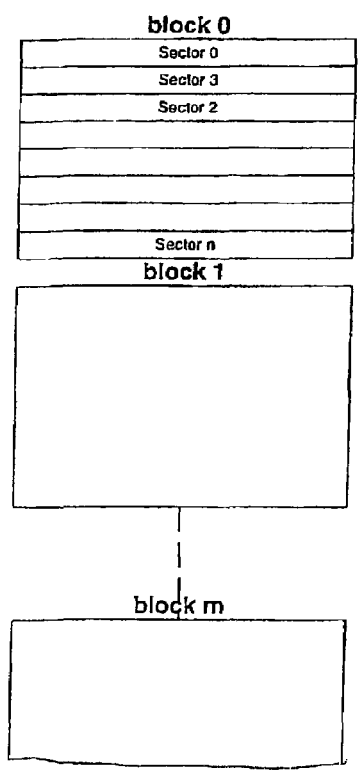
FIG. 5 shows a graphical representation of the virtual blocks into which the flash memory of the flash memory system is organized.

With reference to FIG. 5 the flash memory 20 is organized into virtual blocks each of which includes a number of virtual pages. Each virtual page is of the size of a memory sector (such as "sector 2") which in this case is 528 bytes. Every logical sector, including control over head, is stored in a memory sector, including control overhead, is stored in a memory sector the location of which is defined by the virtual block address and the virtual page address within the virtual block. The memory sector and virtual page need not be a physical partition within Flash memory 20, nor contiguous Flash memory locations, so that the memory sector address may be a virtual address conveniently used by the controller 16.

In the first embodiment of this arrangement the SAT is a table of 3-byte entries, and each entry is called a SAT Entry. Sat Entry i includes the virtual address of the sector with logical address i.

In a second embodiment the SAT has a different structure which is, for example, divided into smaller blocks hierarchically organized in order to provide faster SAT update.

Temporary copies of SAR blocks used as a cache may also have the same entry format as either of the above SAT structure arrangements.

Each SAT Entry virtual address, as with all virtual addresses, comprises two components the first of which is a virtual block number and the second of which is a memory sector offset within the virtual block. The virtual block number comprises all except the least significant byte of the three byte entries. The least significant byte includes the memory sector offset. By restricting to relatively small blocks having a size of not more than 128 memory sectors the maximum sector offset only requires the least significant 7 bits of the Byte.

In a SAT entry, some illegal addresses may be entered to represent special cases. Four such cases are illustrated in Table 1.

In cases 1 and 2, that is the cases in which the sector is a constant data sector (including erased sector) or a bad sector, the virtual block address correspond to reserved locations. This means virtual block addresses 0 and 1 belong to special control blocks used by the controller and can therefore never map onto valid data sectors. The values 0-1 may thus be used to indicate these special cases.

In case 1 the sector includes constant data, so that the whole of the sector offset byte including the illegal bit includes the pattern data which is repeated through the sector. This technique is also used for erased sectors—wherein the constant data pattern is set to all 1s.

In case 2 the sector is marked as bad, and therefore any values in the sector offset byte are immaterial and therefore the sector is set as X=don't care. In this case when the host accesses the sector marked as bad, no operation is performed and error status is returned to the host.

Case 3 represents the valid written sector address recorded in the SAT entry and in this case the virtual block address field word B is set as being greater than 1 and therefore a valid data block number.

In case 4, the extra illegal sector offset-bit in the sector has been erased, but the actual memory sector may not yet have been erased physically. The virtual address of the memory sector is obtained from the entry by setting the extra illegal sector offset bit to zero. This means the word B is a valid data block number, and the legal sector offset bits S yield a valid sector offset. The obsolete copy of such a sector is due to the physically erased and data pattern is due to be set to all 1s. This technique can be used to postpone the physical erase operation in order to do it more efficiently by erasing a large group of memory sectors at a time.

The implementation of the write sector command, normally by the controller microprocessor firmware may be implemented in many ways examples of which will now be given. Each of the detailed examples is for multiple sector commands when the host sends a group of sectors by one command.

In a first embodiment of the implementation of the write sector command the SAT is updated immediately after a repetitive data sector is detected. In this case the logical sector is not written to the flash memory 20, instead the logical sector pattern is recorded in the corresponding SAT entry. The immediate up date of the SAT or, as mentioned, a temporary SAT copy is essential to ensure the contents of the sector are not lost if the command is terminated and power is turned off.

Typically upon implementation of the write sector command the controller 16 checks the pattern of a series of the incoming sectors. The series may include all the logical sectors to be written by the write command or a limited number of sectors written in response to the command (in order to simplify the algorithm). In this case, the series is limited either by the sector count of the write command or until the write-pointer, or W-pointer, reaches end of the block whichever is shorter. The service can also be cancelled when the write-pointer reaches the end of the virtual block as well as when the actual memory write is postponed as detailed in the second and third embodiments respectively. This means that sectors belonging to the same write command can be split to several group. The benefit of this is that it significantly reduces the number of SAT updates and therefore improves performance.

The controller 16 may additionally incorporate a media management operation which is implemented by algorithms which embody the principle that data is written at physical sector locations in Flash memory 20 which follow the same order as the sequence in which the data is written. This is achieved by writing each logical data sector at a physical sector location defined by a cyclic write pointer.

Figure 6:
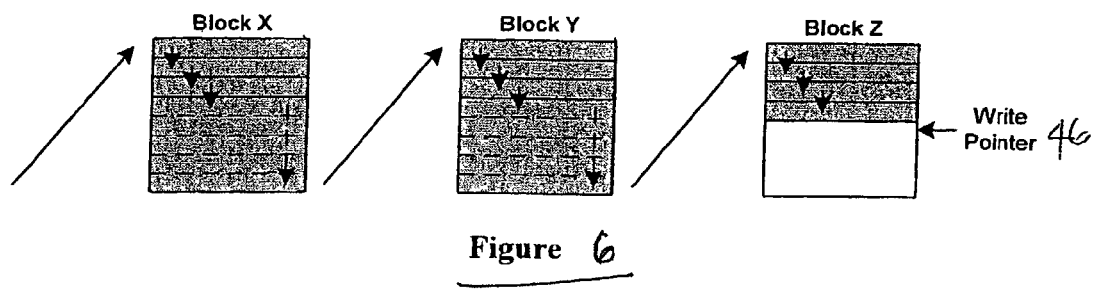
FIG. 6 shows a schematic representation of the data write operation used in FIG. 5.

A schematic representation of such a write operation is shown in FIG. 6. The data write pointer 46 moves sequentially through the memory sector positions of a virtual block in Flash memory, and therefore through a chain of blocks, such as block X, block Y and block Z from which the virtual block is formed, in a manner defined by a block sequencing algorithm. Each of block S, block Y, and block Z is a physical structure in flash memory 20 which, in this case comprises sixteen sector locations which can be erased a single operation.

In a second embodiment of the implementation of the write sector command the controller 16 checks the pattern of a series of the incoming sectors without writing them to the flash memory 20 if the data of the sectors is same, i.e. the data pattern is flat. If all the sectors of the series are of the same flat pattern then the SAT is updated. The case when all the sectors have repetitive data, but, are different from each other can be handled similarly until the SAT is updated, the record of the sectors' pattern being kept in the controller's volatile memory that is the SRAM 32. If a non-flat sector is detected then the series is terminated and a group of previously received flat sectors is written to the flash memory in the original order prior to the last received, first non-flat, write. Although those sectors may no longer exist in the sector buffer they can be recreated by the controller 16 which has information about their data pattern. Having done that, there is no need to mark those sectors as erased in the SAT and the SAT will be updated with their virtual memory addresses as in the prior art system. An alternative process is marking all the flat sectors as erased in SAT without writing them to flash 20. In this case not all the logical sectors written by the same command will be written or erased so they will be handled differently in future write and read commands. However, normally the sectors sent by the same command belong to the same file and it is preferable therefore to handle them all in uniform manner to simplify the operation and improve performance.

In a third embodiment of the implementation of the write sector command the controller 16 checks the pattern of a series of the informing sectors and writes them to flash 20 in the normal way.

When all the sectors of the series are of the same flat pattern then the sectors are erased and the SAT is updated by their patterns. The case when all the sectors have repetitive data, but different from each other is handled similarly. This method is slow as the sectors are written and then erased, but, is more reliable as the latest copies of the sectors would not be lost if the write command is terminated and the power is turned off.

Figure 1:
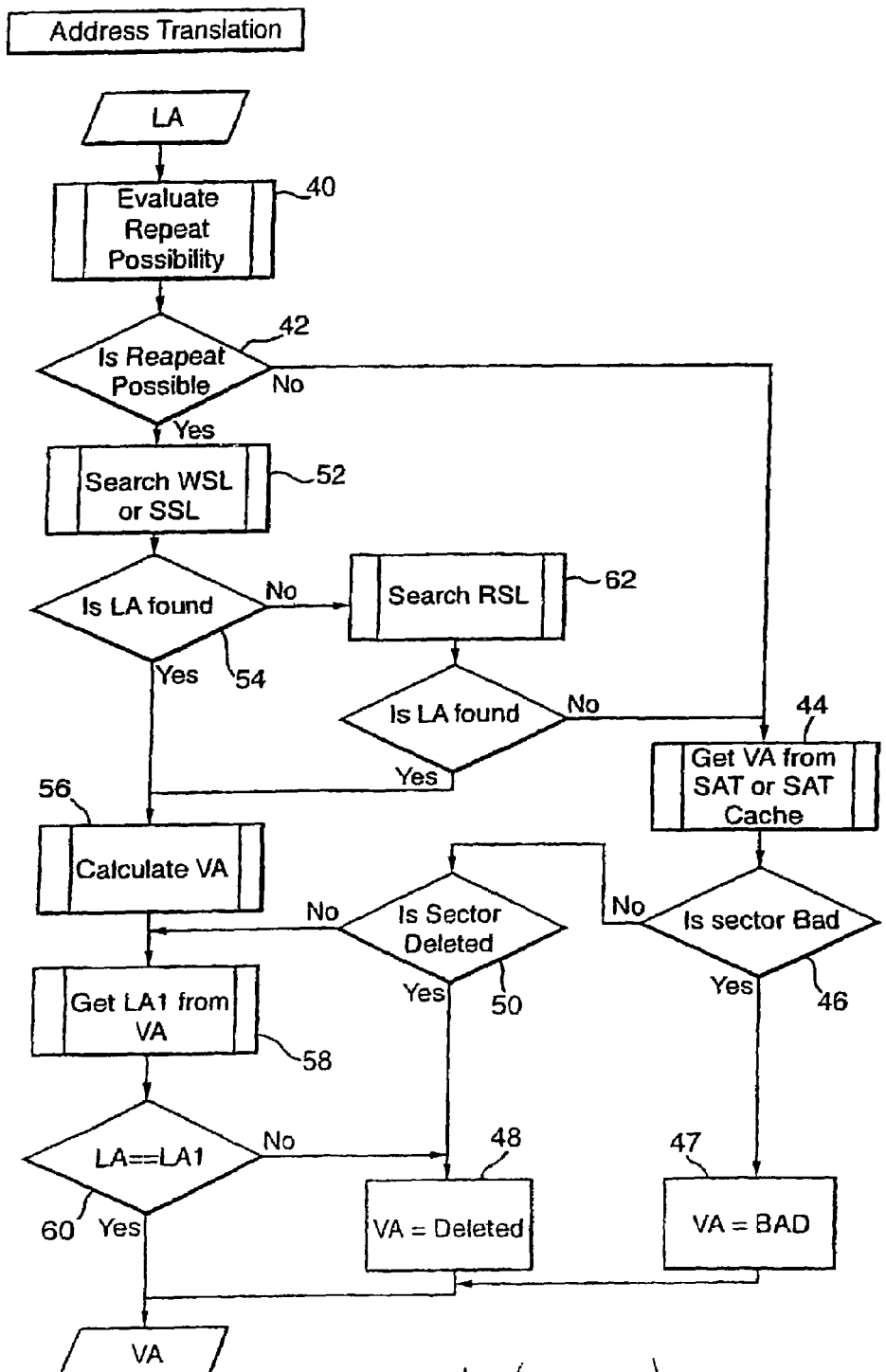
FIG. 1 shows an address translation algorithm of a prior art memory system.
Figure 2:
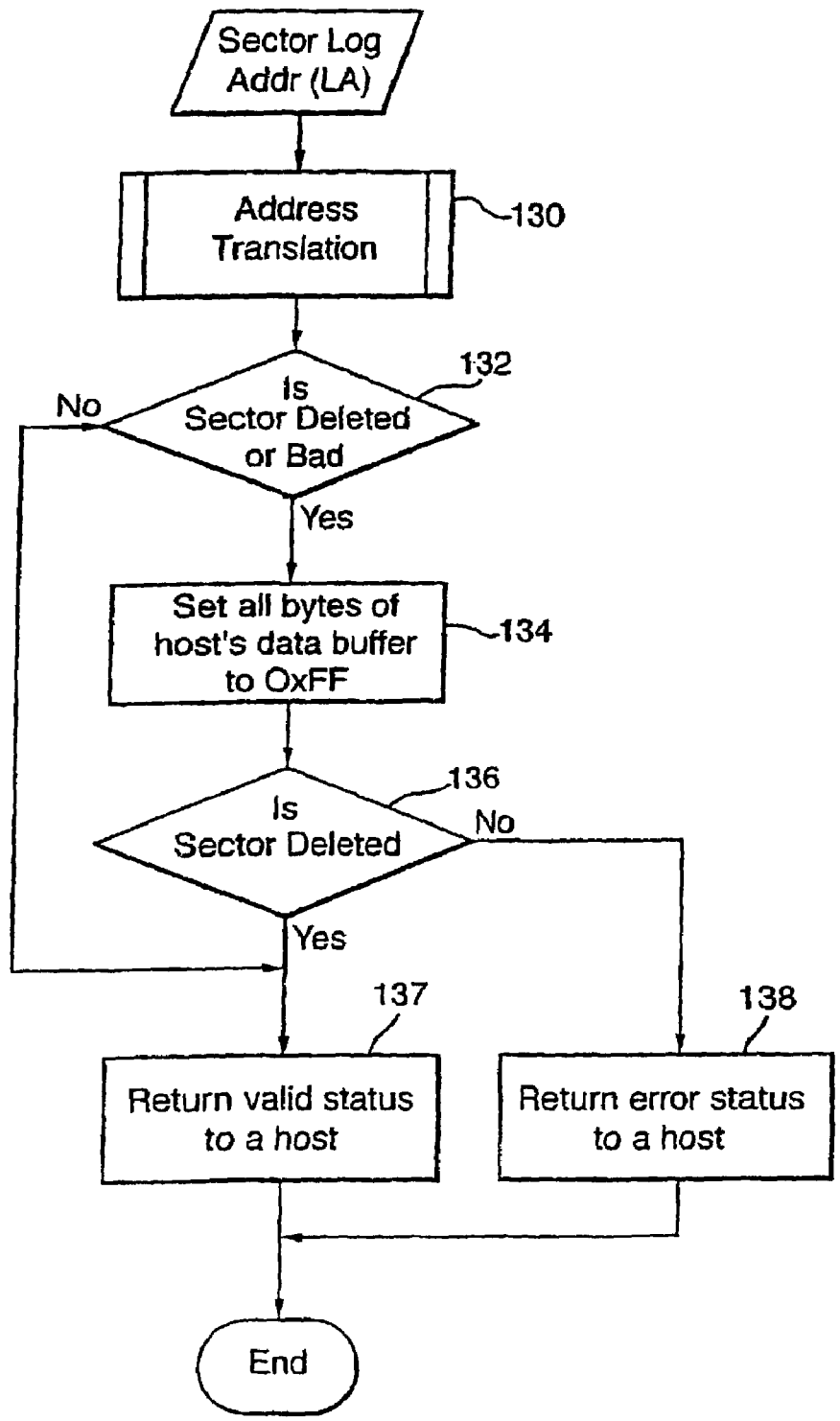
FIG. 2 shows a sector read operation of a prior art memory system.

In each of the above embodiments of the implementation of the write sector command the obsolete copies of the sectors rewritten or erased by the write command should be marked obsolete in a Current Obsolete Block list (COB) which is maintained by the controller for subsequent bulk erasure and erased upon the issuing of an erase sector command sent from the host 12. The erasure process is performed as a foreground operation during the sector write process. At the end of the write command the SAT must be updated in flash 20 to record the latest change of the sectors erased or marked as erased, as well as this the control data structures in flash should be updated to record the latest COB. Recording the latest COB is particularly important, as upon erasing a sector the controller has no record of whether the latest existing copy of the sector was written before or after the sector was erased. The updated COB will therefore contain the correct information about obsolete sector copies. In the context of the system being described, the read operation is implemented similarly to that shown in FIG. 2 (prior art) which illustrates by the read operation of the "Memory System", detailed in patent application WO 00/49488.

If the sector to be read from the flash memory 20 is found to marked as erased in the SAT then the controller 16 programs the pattern output circuit 23b located in host interface control 22 (FIG. 4a) by the repetitive sector pattern. The host then receives the original sector data generated by the pattern output circuit 23b instead of being read from flash 20.

When the erase sector command is issued by the host the sectors are marked as erased in the SAT with the default pattern. The obsolete copies of the sectors, if there are any not erased previously, must also be erased.

As the erasure of flash memory 20 is often a relatively long operation the controller 16 uses a technique of marking the sectors as erased in SAT without physically erasing them, as described above in case 3 of the SAT entry format. Having collected a group of such sectors the controller 20 is then able to erase many memory sectors at once by a single flash erase operation. This ability to perform block erasure is defined by flash memory architecture.

Various modifications may be made, for example, the ROM and the expansion port included in the controller of FIGS. 4a and 4b are optional components only. The logical address identifying each sector has been described as a sequential Logical Block Address, however, an address in the Cylinder/Head/Sector (CHS) format originally used with magnetic disk devices may be used. It should also be noted that pages within the flash array have been described as being equivalent to a sector; however, in some AND flash memory chips a page may comprise four sectors and have a capacity of 211 bytes.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

TABLE 1

| Case Number | Virtual Block Address Field | Memory Sector Offset Illegal Bit | Memory Sector Offset Legal Bits | Description |
|---|---|---|---|---|
| 1 | 0 | Constant Pattern Data | | Constant Data Sector (including Erased Sector) |
| 2 | 1 | X (don't care) | | Bad Sector |
| 3 | B > 1 | 0 | S | Valid Written Sector |
| 4 | B > 1 | 1 | S | Sector Marked as Erased |

What is claimed is:

1. A method of data storage and retrieval for use in a solid state memory system in placement of conventional hard disk, having a non-volatile memory, wherein data is written to the non-volatile memory in the form of at least one sector, the method comprising:
   organizing the non-volatile memory into physical sectors for storage of sector data, a physical sector including data from a host and overhead data;
   receiving a sector write command indicative of writing logical sector data of a logical sector;
   receiving the logical sector data for writing thereof into a previously-erased physical sector of the non-volatile memory, wherein the logical sector data comprises two or more data portions;
   monitoring the logical sector data which is to be written to the non-volatile memory;
   detecting the presence of a repetitive pattern in the logical sector data if all data portions of the logical sector data have the same value;
   upon detecting a repetitive pattern, recording one data portion of the logical sector data in a sector address table in the non-volatile memory system without recording any data portions of the logical sector data in a physical sector in the non-volatile memory; and
   erasing an obsolete copy of the logical sector data from a physical sector in the non-volatile memory.

2. The method of data storage as recited in claim 1, further including marking the corresponding logical sector as being erased after the one data portion of the logical sector has been recorded in the sector address table.

3. The method of data storage as recited in claim 1, further comprising:
   upon detecting that the logical sector data does not contain a repetitive pattern, recording all data portions of the logical sector data in a physical sector in the non-volatile memory.

4. A non-volatile memory, in place of a conventional hard disk, organized into sectors to which data is written into at least one logical sector, the non-volatile memory comprising:
  means for receiving a sector write command indicative of writing a logical sector data of a logical sector and receiving the logical sector data for writing thereof into a previously-erased physical sector of the non-volatile memory;
  means for monitoring logical sector data which is to be written to the non-volatile memory;
  means for detecting the presence of a repetitive pattern in the logical sector data, wherein a repetitive pattern is indicated by the presence of the same pattern value in each of two or more data portions of the logical sector data;
  recording means for recording the pattern value of the logical sector data, and means for writing to the recording means;
  means for marking a corresponding logical sector as being erased; and
  means for erasing an obsolete copy of the logical sector data in the non-volatile memory wherein upon detection of a repetitive pattern, a recording of the repetitive pattern value of the logical sector data is made to the recording means without writing any data portion of the logical sector data to the corresponding physical sector location in the non-volatile memory.

5. The non-volatile memory as recited in claim 4, further comprising:
  wherein upon detecting that the logical sector data does not contain a repetitive pattern, a recording of all data portions of the logical sector data is made to the corresponding physical sector location in the non-volatile memory.

6. A non-volatile memory system comprising:
  a controller coupled between a host and a non-volatile memory for transferring sector data therebetween, the non-volatile memory organized into physical sectors for storage of sector data and the controller including,
  a host interface control block, a logical interface coupled to the host interface control block, a microprocessor, a flash interface control block coupled to a physical interface, a Read Only Memory (ROM) and a synchronous random access memory (SRAM), the host interface control block providing a path to the controller for flow of sector data to and from the host, a pattern detection means for comparing data portions of sector data received from the host with each other, upon receiving a sector write command from the host and indicating to the microprocessor whether the host-provided sector data has a repetitive pattern of its data portions, the microprocessor receiving a pattern value of a data portion of the host-provided sector data for writing to a sector address table of the non-volatile memory system if a repetitive pattern is indicated for the host-provided sector data and using it to avoid writing any data portion of the host-provided sector data to a physical sector of the non-volatile memory.

7. The non-volatile memory system, as recited in claim 6, wherein the host interface control block includes a pattern detection circuit for comparing data portions of the sector data received from the host with each other to determine whether each data portion of the sector data contains the same pattern value.

8. The non-volatile memory system, as recited in claim 7, wherein the pattern detection circuit is configured for detecting a flat pattern.

9. The non-volatile memory system, as recited in claim 6, wherein the SRAM is configured for storing the pattern value.

10. The non-volatile memory system, as recited in claim 6, wherein the host interface includes a pattern output circuit, programmed by the microprocessor, to generate a particular pattern, to the host, when a sector read command is received from the host to reconstruct the sector data using the stored pattern value.

11. The non-volatile memory system, as recited in claim 6, wherein the sector address table includes entries, an entry including a virtual address of a sector of data, a virtual address having a virtual block number and a sector offset, the virtual block number identifying a block within the non-volatile memory, a block having more than one sector of data, the sector offset identifying a sector within the block identified by the virtual block number.

12. The non-volatile memory system, as recited in claim 6, wherein a sector of data includes overhead.

13. A method of writing in a non-volatile memory system comprising:
  receiving a sector write command from a host;
  receiving sector data to be stored in non-volatile memory, the non-volatile memory organized into physical sectors for storage of sector data;
  detecting a repetitive pattern in the host-provided sector data; and
  avoiding writing any data portion of the host-provided sector data to a physical sector of the non-volatile memory by writing a portion of the sector data to a sector address table of the non-volatile memory system and indicating the presence of a repetitive pattern to permit reconstruction of the sector data from the portion of the sector data.

* * * * *

UNITED STATES PATENT AND TRADEMARK OFFICE
CERTIFICATE OF CORRECTION

PATENT NO. : 7,634,624 B2
APPLICATION NO. : 10/256891
DATED : December 15, 2009
INVENTOR(S) : Gorobets It is certified that error appears in the above-identified patent and that said Letters Patent is hereby corrected as shown below:

In column 1, line 9, delete "Retreival"," and insert -- Retrieval", --, therefor.

Signed and Sealed this

Twenty-third Day of March, 2010

David J. Kappos
*Director of the United States Patent and Trademark Office*